Nov. 21, 1939. B. M. LAULHERE 2,180,596
METHOD OF TREATING NATURAL GAS
Filed March 5, 1938 2 Sheets-Sheet 1

Inventor
Bernard M. Laulhere.

Attorney.

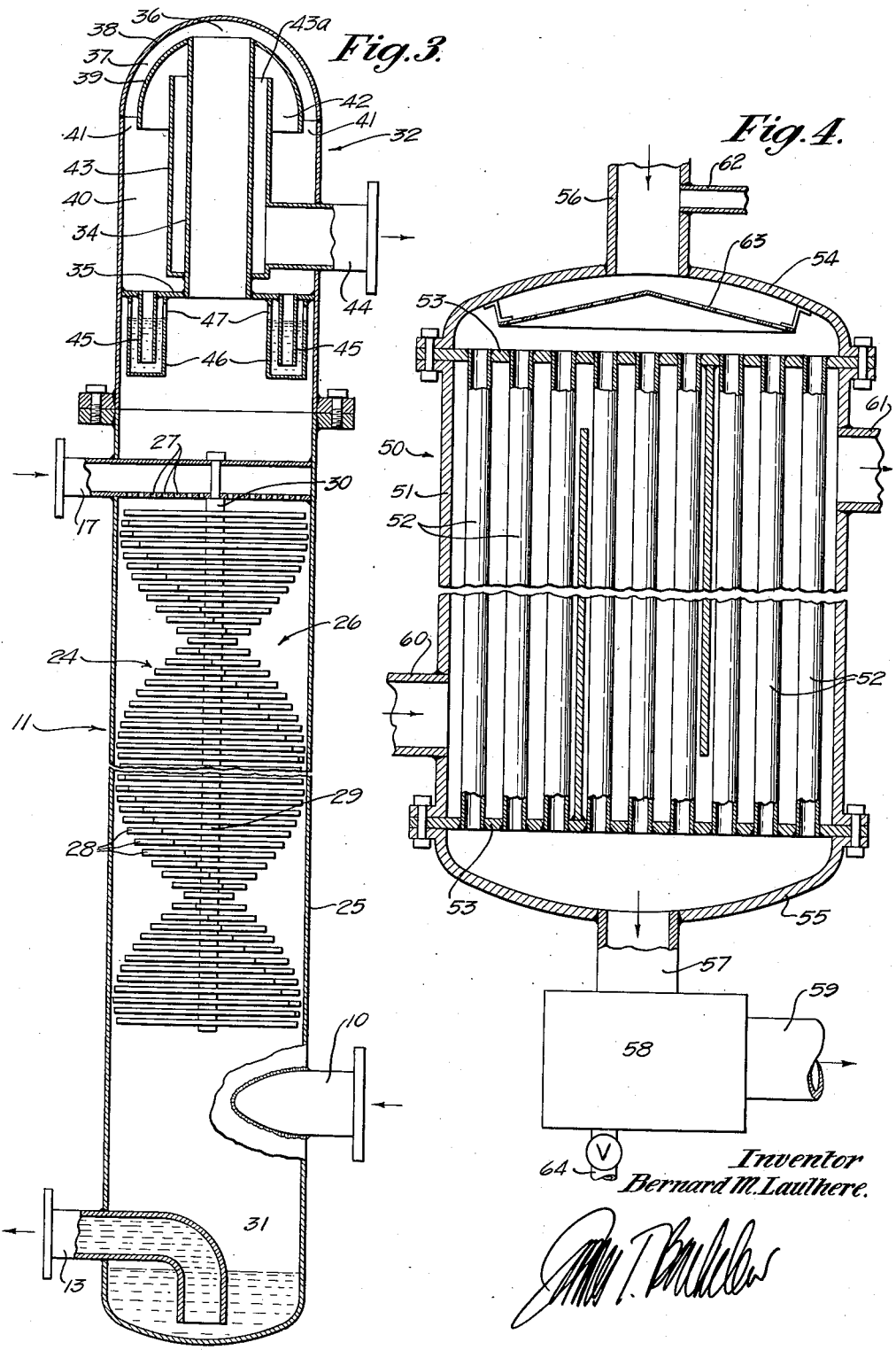

Patented Nov. 21, 1939

2,180,596

UNITED STATES PATENT OFFICE 2,180,596

METHOD OF TREATING NATURAL GAS

Bernard M. Laulhere, Walnut Park, Calif., assignor to The Fluor Corporation, Ltd., Los Angeles, Calif., a corporation of California Application March 5, 1938, Serial No. 194,120

12 Claims. (Cl. 183—120)

This invention relates generally to an improved system for cooling natural gas, and has for its primary object to prevent the formation of precipitated hydrates in the gas during the cooling stage.

In its commercial production, natural gas flowing from the wells ordinarily is treated in an absorption plant to remove heavier hydrocarbons, for example those having boiling ranges higher than normal butane. Absorption treatment of the gas usually is conducted under high pressures, which may be particularly high where the gas leaving the absorption plant is to be maintained under pressures sufficient for distribution of the gas in ground pipes through long distances to points of ultimate use. In its natural condition the gas contains considerable moisture, frequently to the point of saturation, that is not removed in the absorption plant. Accordingly, it is necessary to at least partially dehydrate the gas for the reason that a combination of reduced pressures and lowered temperatures in the distributing lines otherwise would produce excessive moisture condensation and hydrate formation in the pipes, to obvious disadvantage.

Some of the customary methods of dehydrating natural gas involve the use of hygroscopic or moisture absorptive liquids such as glycerin, amines and the like, which are contacted with the gas to absorb water vapor, then heated to vaporize the absorbed water, and recirculated for successive treatment of the gas. The present process has a number of advantages over these usual absorption systems, in that it does not require the use of special or expensive absorbents, or the considerable extra equipment that is required to handle and regenerate or dehydrate the absorbents. As compared with such processes, the invention is distinguished in that it pertains to gas cooling rather than absorption systems. Natural gas also has been cooled by indirect cooling, as in tubular heat exchangers. While the moisture is not absorbed from the gas, water is partially removed by condensation, to an extent depending upon the temperature and pressure of the cooled gas. Water has been used as the cooling medium, although to the best of my knowledge, water heretofore has been used to cool natural gas indirectly only, that is by maintaining the cooling water and gas out of direct contact and at opposite sides of the heat transfer walls of the cooling apparatus.

The invention is intended primarily to overcome a serious difficulty frequently encountered in such indirect gas cooling systems, resulting from the formation of so-called "hydrates" in the gas cooling passages of the equipment. These hydrates consist of crystalline solid bodies which apparently are water addition products of certain constituents of the natural gas, and which precipitate out of the gas under certain more or less critical conditions, depending upon the temperature, pressure and composition of the gas. Where these critical conditions exist in particular portions of the gas cooling passages of the cooling apparatus, the solid hydrates precipitate at such a rate as frequently to completely clog the passages in short periods of time, necessitating shut-downs for removal of the hydrates.

As a result of experiments, it has been found that the hydrates will not precipitate in the presence of a substantial amount of free water in the gas. The minimum amounts of water required in the gas to prevent hydrate formation has not been determined, and cannot be given for all natural gases in view of the fact that the conditions of hydrate formation may vary with differences in the gas composition. However, more water is required than an amount that will condense out of the gas when, for example, a moisture saturated natural gas is cooled through a comparatively small temperature drop above the critical temperature of hydrate formation. This is established by the fact that hydrates are known to form under such conditions in actual plant operations. It may be that in some instances where the gas is cooled through a wide temperature drop above the critical temperature of hydrate formation, there will be sufficient water condensate present to prevent precipitation of the solid hydrate. However, this latter condition, though it may exist at times, cannot be relied upon in continuous plant operation, due to the number of continuously changing variables that affect the gas cooling range, and hence it is necessary to provide means for assuring the prevention of hydrate precipitation under any given set of conditions that may exist in the gas cooling stage of the system.

I have found, in accordance with the invention, that possibility of hydrate precipitation can be obviated by maintaining the gas while it is being cooled, in direct contact with an excess of water introduced to the gas stream. Preferably, the water so introduced also is used to cool the gas, although, as will later appear, the broad concept of introducing water to the gas stream to prevent hydrate precipitation may also be applied to indirect gas cooling systems of the character outlined above. In either case, however, the gas during cooling is maintained in direct contact with sufficient water, or an excess of water, in the presence of which no precipitation of hydrates can occur.

The above mentioned objects of the invention, as well as additional features thereof, will be more fully understood and explained to better advantage in the following detailed description of certain typical and illustrative gas cooling systems embodying the invention. Reference is made throughout the description to the accompanying drawings, in which:

Fig. 3 is an enlarged sectional view of the direct contact cooler shown in Fig. 2; and Fig. 4 is illustrative of an adaptation of the invention to multiple tube gas coolers.

Figure 1:
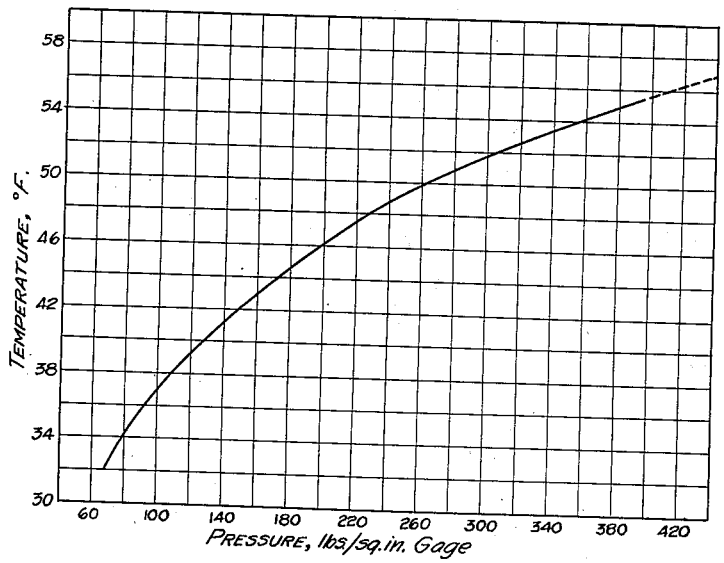
Fig. 1 shows an experimentally determined hydrate formation curve of a typical natural gas.

The objectives of the invention, particularly with respect to the elimination of hydrate precipitation in the gas cooling stage, can be explained to best advantage by referring first to the curve shown in Fig. 1. This curve shows the relative temperatures and pressures of hydrate formation in a typical natural gas having on an anhydrous basis the following analysis:

| | |
|---|---|
| Air | 1.00 |
| Carbon dioxide | 0.20 |
| Methane | 87.92 |
| Ethane | 4.45 |
| Propane | 4.86 |
| Iso-butane | 0.50 |
| N-butane | 1.00 |
| Residue | 0.07 |
| | 100.00 |

The curve of Fig. 1 was determined by measuring the decomposition temperatures within the pressure range indicated, of the hydrates formed in the sample of wet gas of the above anhydrous composition. Although the particular percentage of moisture in a natural gas required for hydrate formation under all various possible conditions has not been fully determined, and undoubtedly at least is subject to variation depending upon the composition of the gas, it may be assumed in the discussion to follow that the gas initially is water saturated, since it is known from actual plant operations that the hydrate will precipitate in a moisture saturated gas when cooled to a critical temperature of hydrate formation depending upon the gas pressure. As indicated, the curve of Fig. 1 was obtained by measuring the decomposition temperatures of the hydrate throughout a pressure range of from substantially 65 to 400 lbs. per sq. in. gage, the temperature-pressure values at any point represented by the curve being of a limiting order in that only substantially at points on or below the curve do the solid hydrate and gas phases exist in equilibrium.

Thus the solid hydrate will not be present in the gas at given pressure and under equilibrium conditions, at temperatures above the temperature represented by the point on the curve corresponding to that pressure; likewise, at a given temperature, the solid hydrate does not exist in the gas at pressures below the pressure represented by the point on the curve corresponding to that temperature. Assuming, for example, the gas pressure to be 400 lbs. per sq. in. gage and that the gas is to be cooled to a temperature below 50° F., precipitation of the hydrate occurs during cooling of the gas, at a temperature slightly under 56° F. The hydrate also exists in solid form at temperatures below its temperature of formation at that pressure, and therefore remains in the gas as the gas is subjected to further cooling. As previously indicated, the difficulty encountered in the past has been that in cooling a stream of natural gas, the gas passage or passages within the cooler become clogged by the solid hydrate at points where the gas has become cooled to or beyond the temperatures of hydrate formation. The primary object of the invention, therefore, is to prevent precipitation of the hydrate at such points, and to obviate conditions at any points within the cooling apparatus under which it is possible for the hydrate to precipitate.

Figure 2:
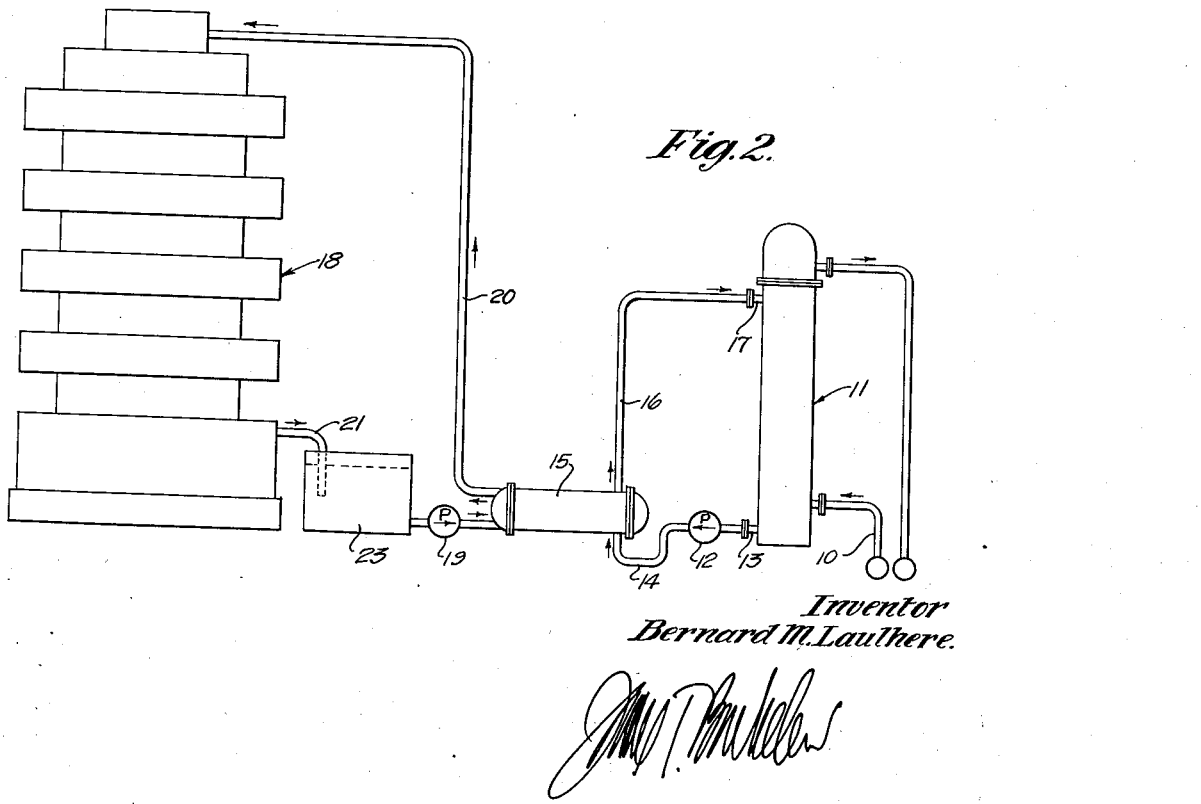
Fig. 2 is a general view illustrating a preferred system for carrying out the invention.

A typical system for carrying out the invention is shown in Fig. 2, wherein the absorption plant treated gas to be cooled, and which may be assumed to be water saturated, is supplied through line 10 to the base of a cooler generally indicated at 11. In the cooler the gas is cooled by direct contact with water continuously circulated by pump 12 from the outlet 13 through line 14 to heat exchanger 15, and thence through line 16 to the cooler inlet 17. It is to be understood that any suitable means may be provided for cooling or refrigerating the water introduced to the gas cooler. As typical, I show a heat exchanger 15 within which the water is cooled by transference of heat to water being continuously circulated by pump 19 through the heat exchanger and thence through line 20 to the top of the cooling tower 18, the cooled water being withdrawn from the base of the tower through line 21 into a basin or reservoir 23.

Referring now to Fig. 3, in its preferred form the cooler 11 comprises suitable means, generally indicated at 24, for effecting intimate and extended contact between the gas introduced through line 10 to the base of the shell 25, with the down flowing stream of cooled water being discharged downwardly through the cooling zone 26 through openings 27 in the inlet pipe 17. The water and gas contacting means 24 is shown typically to comprise a vertical series of spaced horizontally extending baffles 28 arranged in spiral form, as illustrated, on a support 29 suspended at 30 from the water inlet pipe 17, or otherwise suitably mounted. The gas introduced through the inlet 10 assumes a generally spiral course of flow upwardly through the baffle section of the cooler, in direct and intimate contact with the water flowing downwardly over and between the spirally arranged baffles 28. The water collecting in the bottom chamber 31 of the shell is separated from the gas by continuous withdrawal through outlet 13 to the heat exchanger 15.

The cooled gas leaving the baffle section is freed of all liquid entrainment in passing through a separator, generally indicated at 32, within the upper interior of the cooler. For a more extensive and detailed description of the particular type of separator shown, reference may be had to a copending application, Ser. No. 194,118, filed Mar. 5, 1938, by Henderson, Reddick and Laulhere on Separator. The gas flowing upwardly above the water inlet pipe enters a pipe 34 extending through plate 35, and is discharged at 36 into the axial center of an annular, downwardly curved separating passage 37 formed between the hemispherical head 38 of the shell, and a correspondingly shaped inner wall or baffle 39 mounted on the upper end of pipe 34. Initial separation of liquid from the gas occurs during downward flow of the gas through passage 37, the entrained liquid largely being thrown outwardly against the inner surface of the head 38, and thence caused to drain downwardly along the wall of the shell to the base of chamber 40. Upon leaving the separating passage outlet 41 the gas is subjected to sudden reduction of velocity in entering the enlarged chamber 40, and also to complete reversal of flow in passing upwardly through outlet passage 42 between pipe 43 and the inner separating passage wall 39. Both of these effects, i. e. sudden reduction in velocity and complete reversal of flow, accomplish final removal of any entrainment remaining in the gas after its discharge from the separating passage. The dry gas enters the upper end 43a of pipe 43 at a substantial distance above the lower edge of wall 39, and leaves the cooler through outlet pipe 44. Suitable means may be provided for draining the separated water from the bottom of chamber 40 into the lower section of the cooler. As typical, I show drain tubes 45 extending downwardly within liquid seal cups 46 having overflow openings 47; the drain tubes thus being sealed by liquid columns of sufficient height to prevent the gas from blowing upwardly through the tubes.

In considering the operation of the system, it may be assumed the gas entering the cooler 11 from line 10 at 400 lbs. per sq. in. gage pressure, is to be cooled from 60° F. to 52° F. by direct contact with water cooled in the heat exchanger 15 to a temperature of around from 50° F. As will be seen by reference to Fig. 1, within this cooling range, the gas temperature drops into the temperature range of hydrate formation, i. e. below about 53.6° F. No precipitation of hydrate occurs within the cooler, however, due to the presence of excess water in direct contact with the gas. Where the gas temperature is to be lowered through a substantial range, as always in commercial operation, the amount of water at the lowest obtainable water temperatures, required to cool the gas will be sufficient or considerably more than sufficient, to prevent the precipitation of hydrates. It will be understood of course that the gas is maintained under its high pressure throughout the cooling stage, and that the cooled high pressure gas is discharged through outlet 44 for distribution to distant points through the field ground lines.

Indications have been had from plant operations that perhaps some hydrates and the circulated water may be in a condition of unstable equilibrium, as evidenced by evolution of some gas from the water. And although difficult to determine with certainty, it is possible that some hydrates may form temporarily, and then disintegrate, but it is established that at no time will hydrates accumulate to the extent of clogging the cooling zone, as has been the difficulty in prior systems operating on a simple cooling principle. Also it is indicated that the absence of any serious accumulation of hydrates in the cooling zone may be due to the combined velocity or washing action of the water and its effect as a deterrent against hydrate formation. All the theoretical reasons why it is possible to prevent by mere circulation of water in contact with the gas, accumulation of hydrates in clogging quantities, have not fully been determined, but as a matter of actual practice, the system has been found to perform highly satisfactorily in large quantity commercial treatment of natural gas.

In Fig. 4 of the drawings, I have illustrated an adaptation of the invention to an indirect type of gas cooler shown typically as a tubular heat exchanger 50 comprising a shell 51 containing tubes 52 terminating within sheets 53 clamped between the shell and upper and lower heads 54 and 55. The high pressure gas introduced through the inlet line 56 flows downwardly through the tubes to the outlet 57 and thence through the diagrammatically illustrated water trap or separator 58 to the discharge line 59. The gas is cooled during its flow through the tubes 52 by water or other cooling fluid flowing from the inlet 60 through the shell in contact with the tubes, to the outlet 61.

As previously explained, the common tendency has been for the hydrates to precipitate in the tubes at points where the gas has become cooled to a degree corresponding to the temperature of hydrate formation at the particular gas pressure. Here the precipitation of hydrates is prevented by introducing water to the gas stream at some suitable point, for example through pipe 62 connecting with the gas inlet pipe 56, so that an excess of water is present in the tubes 54. Suitable means, such as a perforated spreader baffle 63, may be provided for the purpose of facilitating distribution of the water to the inlet ends of all the tubes. The water thus introduced to the gas stream, together with additional water condensing out of the gas, may be finally removed from the cooled gas in separator 58 and withdrawn to line 64.

I claim:

1. The method of treating natural gas containing hydrate forming compounds, that includes passing a stream of the gas under high pressure and at a temperature above the temperature of hydrate formation at that pressure, through a cooling zone, and cooling the gas in said zone to a temperature below the temperature of hydrate formation in the presence of water introduced to the gas stream in sufficient quantity to prevent clogging accumulations of precipitated hydrates in said zone at their temperature of formation.

2. The method of treating natural gas containing hydrate forming compounds, that includes passing a stream of the gas under high pressure and at a temperature above the temperature of hydrate formation at that pressure, through a cooling zone, cooling the gas in said zone to a temperature below the temperature of hydrate formation in the presence of water introduced to the gas stream in sufficient quantity to prevent clogging accumulations of precipitated hydrates in said zone at their temperature of formation, and then separating the water from the gas while the gas is maintained under its high pressure.

3. The method of treating natural gas containing hydrate forming compounds, that includes passing a stream of the gas under high pressure and at a temperature above the temperature of hydrate formation at that pressure, through a cooling zone, cooling the gas in said zone to a temperature below the temperature of hydrate formation in the presence of water introduced to the gas stream in sufficient quantity to prevent clogging accumulations of precipitated hydrates in said zone at their temperature of formation, then separating the water from the gas while the gas is maintained under its high pressure, and cooling the separated water and returning it to said cooling zone.

4. The method of treating natural gas obtained from an absorption plant and containing hydrate forming compounds, that includes passing a stream of the gas under pressure in excess of substantially 100 lbs. per sq. in. and at a temperature above the temperature of hydrate formation at that pressure, through a cooling zone, and cooling the gas in said zone to a temperature below the temperature of hydrate formation in the presence of water introduced to the gas stream in sufficient quantity to prevent clogging accumulations of precipitated hydrates in said zone at their temperature of formation.

5. The method of treating natural gas obtained from an absorption plant and containing hydrate forming compounds, that includes passing a stream of the gas under pressure in excess of substantially 100 lbs. per sq. in. and at a temperature above the temperature of hydrate formation at that pressure, through a cooling zone, cooling the gas in said zone to a temperature below the temperature of hydrate formation in the presence of water introduced to the gas stream in sufficient quantity to prevent clogging accumulations of precipitated hydrates in said zone at their temperature of formation, then separating the water from the gas while the gas is maintained under its high pressure, and cooling the separated water and returning it to said cooling zone.

6. The method of treating natural gas containing hydrate forming compounds, that includes passing a stream of the gas under high pressure and at a temperature above the temperature of hydrate formation at that pressure, through a cooling zone, cooling a stream of water and then passing the water through said cooling zone in sufficient quantity to cool the gas below the temperature of hydrate formation and to prevent clogging accumulations of precipitated hydrates in said zone at their temperature of formation.

7. The method of treating natural gas containing hydrate forming compounds, that includes passing a stream of the gas under high pressure and at a temperature above the temperature of hydrate formation at that pressure, through a cooling zone, cooling a stream of water and then passing the water through said cooling zone in sufficient quantity to cool the gas below the temperature of hydrate formation and to prevent clogging accumulations of precipitated hydrates in said zone at their temperature of formation, then separating the water from the gas while the gas is maintained under its high pressure, and cooling the separated water and returning it to said cooling zone.

8. The method of treating natural gas containing hydrate forming compounds, that includes passing a stream of the gas under high pressure and at a temperature above the temperature of hydrate formation at that pressure, upwardly through a cooling zone, cooling a stream of water and then passing the water in divided form downwardly through said cooling zone in contact with the rising gas stream, thereby cooling the gas below the temperature of hydrate formation and preventing the formation of clogging accumulations of hydrates in said zone at their temperature of formation.

9. The method of treating natural gas containing hydrate forming compounds, that includes passing a stream of the gas under high pressure and at a temperature above the temperature of hydrate formation at that pressure, upwardly through a cooling zone, cooling a stream of water and then passing the water in divided form downwardly through said cooling zone in contact with the rising gas stream, thereby cooling the gas below the temperature of hydrate formation and preventing the formation of clogging accumulations of hydrates in said zone at their temperature of formation, then separating the water from the gas while the gas is maintained under its high pressure, and cooling the separated water and returning it to said cooling zone.

10. The method of treating natural gas containing hydrate forming compounds, that includes passing a stream of the gas under high pressure and at a temperature above the temperature of hydrate formation at that pressure, upwardly through a cooling zone, cooling a stream of water and then passing the water in divided form downwardly through said cooling zone in contact with the rising gas stream, thereby cooling the gas below the temperature of hydrate formation and preventing the formation of clogging accumulations of hydrates in said zone at their temperature of formation, withdrawing water from the bottom of said cooling zone and then cooling and returning the water to said zone, separating water from the gas at the top of said zone, and returning the separated water to said zone.

11. The method of treating natural gas containing hydrate forming compounds, that includes passing a stream of the gas under high pressure and at a temperature above the temperature of hydrate formation at that pressure, through a plurality of cooling tubes, cooling the gas in said tubes to a temperature below the temperature of hydrate formation, and introducing water into said tubes in sufficient quantity to prevent precipitation of hydrates in the tubes at the temperature of hydrate formation.

12. The method of treating natural gas containing hydrate forming compounds, that includes passing a stream of the gas under high pressure and at a temperature above the temperature of hydrate formation at that pressure, through a plurality of cooling tubes, cooling the gas in said tubes to a temperature below the temperature of hydrate formation by circulating cooled water in contact with the outside of said tubes, introducing water into said tubes in sufficient quantity to prevent precipitation of hydrates in the tubes at the temperature of hydrate formation and separating water from the gas after its passage through said tubes.

BERNARD M. LAULHERE.